(12) United States Patent
Elomari et al.

(10) Patent No.: US 8,647,602 B2
(45) Date of Patent: Feb. 11, 2014

(54) METHOD FOR MAKING ALUMINOSILICATE ZEOLITE SSZ-56

(75) Inventors: Saleh Ali Elomari, Fairfield, CA (US); Timi Pravin Singa, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 137 days.

(21) Appl. No.: 13/491,817

(22) Filed: Jun. 8, 2012

(65) Prior Publication Data

US 2013/0330272 A1 Dec. 12, 2013

(51) Int. Cl.
*C01B 39/04* (2006.01)
*B01J 29/70* (2006.01)
*C01B 39/48* (2006.01)

(52) U.S. Cl.
CPC .......... *C01B 39/48* (2013.01); *C01B 39/04* (2013.01); *B01J 29/70* (2013.01)
USPC ........................................ 423/706

(58) Field of Classification Search
CPC ........... C01B 39/48; C01B 39/04; B01J 29/70
USPC ........................................ 423/706
See application file for complete search history.

(56) References Cited

U.S. PATENT DOCUMENTS 6,464,956 B1 * 10/2002 Elomari ................ 423/706
7,226,576 B2 6/2007 Elomari

FOREIGN PATENT DOCUMENTS

WO 98/29339 7/1998

OTHER PUBLICATIONS

S. Elomari, A. Burton, R.C. Medrud, R. Grosse-Kunstleve "The Synthesis, Characterization, and Structure Solution of SSZ-56: An Extreme Example of Isomer Specificity in the Structure Direction of Zeolites" Microporous Mesoporous Mater. 2009, 118, 325-333.
PCT International Search Report, PCT/US2013/042463, mailed Sep. 3, 2013.
S. Elomari, A. Burton, R.C. Medrud and R. Grosse-Kunstleve "The synthesis, characterization, and structure solution of SSZ-56: An example of isomer specificity in the structure direction of zeolites" Micropor. Mesopor. Mater. 2009, 118, 325-333.

* cited by examiner

*Primary Examiner* — David M Brunsman
(74) *Attorney, Agent, or Firm* — Terrence Flaherty

(57) ABSTRACT

Aluminosilicate zeolite SSZ-56 is directly prepared using a 1-butyl-1-(3,3,5-trimethylcyclohexyl)piperidinium cation as a structure directing agent.

7 Claims, 4 Drawing Sheets

METHOD FOR MAKING ALUMINOSILICATE ZEOLITE SSZ-56

TECHNICAL FIELD

This disclosure relates generally to a method for directly preparing aluminosilicate zeolite SSZ-56 using a 1-butyl-1-(3,3,5-trimethylcyclohexyl)piperidinium cation as a structure directing agent ("SDA").

BACKGROUND

Molecular sieves are a class of important materials used in the chemical industry for processes such as gas stream purification and hydrocarbon conversion processes. Molecular sieves are porous solids having interconnected pores of different sizes. Molecular sieves typically have a one-, two- or three-dimensional crystalline pore structure having pores of one or more molecular dimensions that selectively adsorb molecules that can enter the pores and exclude those molecules that are too large. The pore size, pore shape, interstitial spacing or channels, composition, crystal morphology and structure are a few characteristics of molecular sieves that determine their use in various hydrocarbon adsorption and conversion processes.

For the petroleum and petrochemical industries, the most commercially useful molecular sieves are known as zeolites. Zeolites are metallosilicates having an open framework structure formed from corner sharing the oxygen atoms of [SiO$_4$] and other metal oxides such as [AlO$_4$]tetrahedra. Mobile extra-framework cations reside in the pores for balancing charges along the zeolite framework. These charges are a result of substitution of a tetrahedral framework cation (e.g., Si$^{4+}$) with a trivalent or pentavalent cation. Extra-framework cations counter-balance these charges preserving the electro-neutrality of the framework, and these cations are exchangeable with other cations and/or protons.

In principle, there are two routes leading to the formation of a particular molecular sieve structure with a particular framework composition, e.g., a particular metallosilicate such as an aluminosilicate of the same crystal structure: (1) direct synthesis and (2) post-synthetic treatment (secondary synthesis). Direct synthesis is the primary route for the synthesis of molecular sieves.

Depending on the nature of the molecular sieves and the chemistry of their formation, some of these molecular sieves can be synthesized using a broad spectrum of framework compositions, e.g., an all-silica form, an aluminosilicate form, and a borosilicate form, whereas the synthesis of other structures succeeds only if certain heteroatoms (e.g., boron) are present in the synthesis mixture and, in turn, incorporated into the framework.

Molecular sieves identified by the International Zeolite Associate (IZA) as having the framework structure code SFS are known. SSZ-56 is a known crystalline SFS material, and is useful in many processes, including various catalytic reactions. Borosilicate SSZ-56 (B-SSZ-56) and methods for making it are disclosed in U.S. Pat. No. 7,226,576 and by S. Elomari et al. in *Microporous Mesoporous Mater.* 2009, 118, 325-333. Borosilicate zeolites, however, are not sufficiently catalytically active to be practicable for certain hydrocarbon conversion processes. Moreover, the SDA used to prepare borosilicate SSZ-56, the trans isomer of N,N-diethyl-2-methyldecahydroquinolinium cation, requires extensive purification as the cis and trans isomers of this molecule have completely different phase selectivities.

To date, attempts for direct synthesis of aluminosilicate SSZ-56 have not been successful.

Accordingly, there exists a need for a method of directly preparing aluminosilicate SSZ-56.

SUMMARY

In one aspect, there is provided a method for preparing aluminosilicate zeolite SSZ-56 by contacting under crystallization conditions: (1) at least one source of silicon; (2) at least one source of aluminum; (3) hydroxide ions; and (4) a 1-butyl-1-(3,3,5-trimethylcyclohexyl)piperidinium cation.

In another aspect, there is provided a process for preparing aluminosilicate zeolite SSZ-56 having, in its calcined form, the X-ray diffraction (XRD) lines of Table 4, by: (a) preparing a reaction mixture containing: (1) at least one source of silicon; (2) at least one source of aluminum; (3) at least one source of an element selected from Groups 1 and 2 of the Periodic Table; (4) hydroxide ions; (5) a 1-butyl-1-(3,3,5-trimethylcyclohexyl)piperidinium cation; and (6) water; and (b) maintaining the reaction mixture under conditions sufficient to form crystals of the zeolite.

In yet another aspect, there is provided an aluminosilicate SSZ-56 zeolite having a composition, as-synthesized and in the anhydrous state, in terms of mole ratios, as follows:

|  | Broad | Exemplary |
| --- | --- | --- |
| SiO$_2$/Al$_2$O$_3$ | 15 to 200 | 15 to 100 |
| Q/SiO$_2$ | 0.02 to 0.05 | 0.02 to 0.05 |
| M/SiO$_2$ | 0 to 0.03 | 0 to 0.03 | wherein Q is a 1-butyl-1-(3,3,5-trimethylcyclohexyl)piperidinium cation and M is selected from the group consisting of elements from Groups 1 and 2 of the Periodic Table.

DETAILED DESCRIPTION

Introduction

Figure 1:
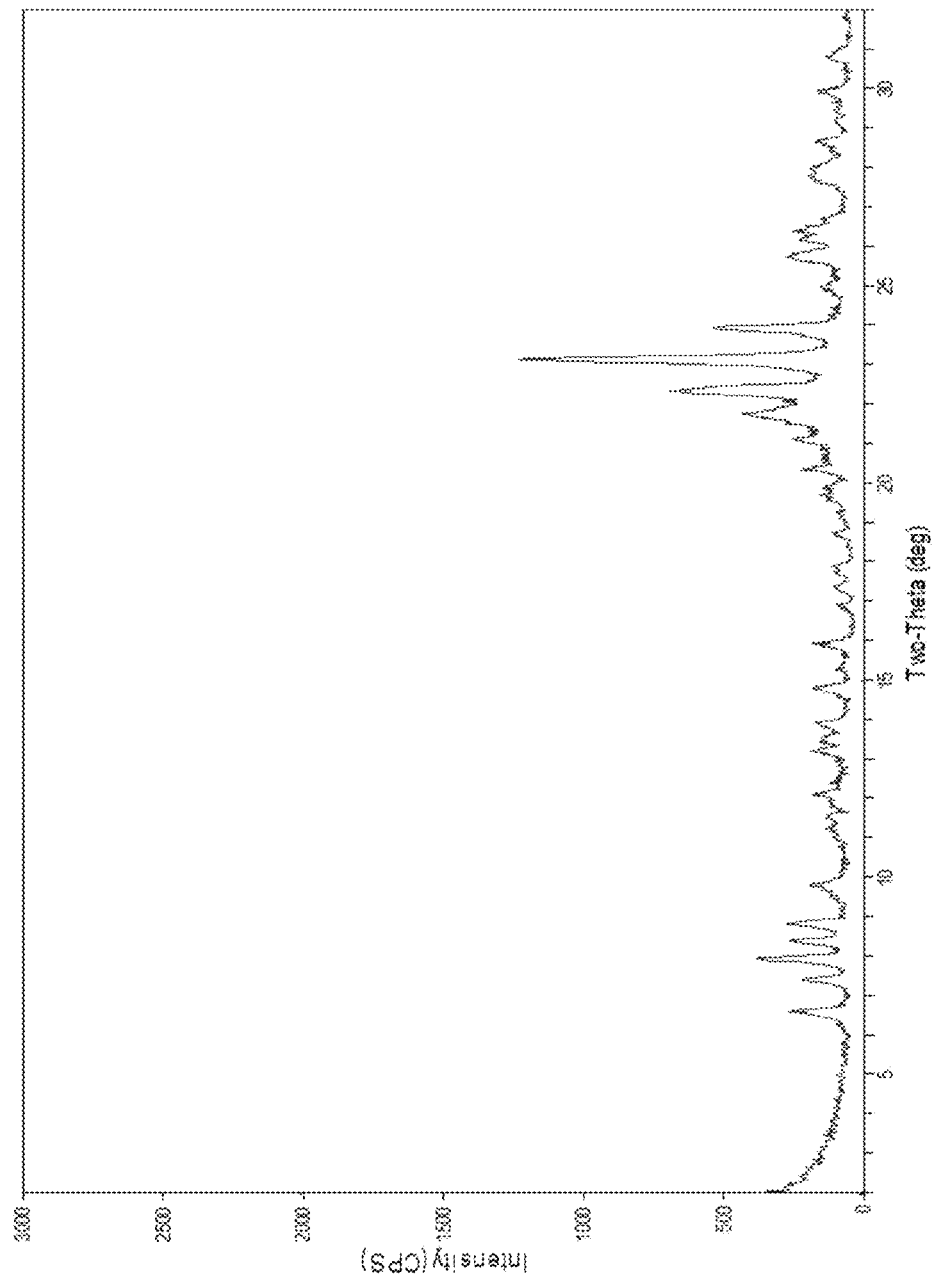
FIG. 1 shows the powder XRD pattern of the as-synthesized aluminosilicate SSZ-56 product of Example 2.

The following terms will be used throughout the specification and will have the following meanings unless otherwise indicated.

The term "active source" means a reagent or precursor capable of supplying at least one element in a form that can react and which can be incorporated into the zeolite structure. The terms "source" and "active source" can be used interchangeably herein.

The term "Periodic Table" refers to the version of IUPAC Periodic Table of the Elements dated Jun. 22, 2007, and the numbering scheme for the Periodic Table Groups is as described in *Chem. Eng. News* 1985, 63(5), 26-27.

In preparing aluminosilicate SSZ-56 (Al-SSZ-56), a 1-butyl-1-(3,3,5-trimethylcyclohexyl)piperidinium cation is used as a structure directing agent ("SDA"), also known as a crystallization template. The SDA useful for making Al-SSZ-56 is represented by the following structure (1):

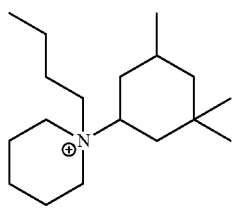

(1)

The SDA cation is associated with anions which can be any anion that is not detrimental to the formation of Al-SSZ-56. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, aluminosilicate SSZ-56 can be prepared by: (a) preparing a reaction mixture containing: (1) at least one source of silicon; (2) at least one source of aluminum; (3) at least one source of an element selected from Groups 1 and 2 of the Periodic Table; (4) hydroxide ions; (5) a 1-butyl-1-(3,3,5-trimethylcyclohexyl)piperidinium cation; and (6) water; and (b) maintaining the reaction mixture under conditions sufficient to form crystals of the zeolite.

The composition of the reaction mixture from which the zeolite is formed, in terms of mole ratios, is identified in Table 1 below:

TABLE 1

| Reactants | Broad | Exemplary |
| --- | --- | --- |
| $SiO_2/Al_2O_3$ | 15 to 200 | 30 to 60 |
| $OH^-/SiO_2$ | 0.10 to 0.50 | 0.20 to 0.30 |
| $Q/SiO_2$ | 0.05 to 0.50 | 0.10 to 0.30 |
| $M/SiO_2$ | 0.02 to 0.40 | 0.10 to 0.25 |
| $H_2O/SiO_2$ | 20 to 80 | 30 to 45 | wherein Q is a 1-butyl-1-(3,3,5-trimethylcyclohexyl)piperidinium cation and M is selected from the group consisting of elements from Groups 1 and 2 of the Periodic Table.

Sources of silicon useful herein include fumed silica, precipitated silicates, silica hydrogel, silicic acid, colloidal silica, tetra-alkyl orthosilicates (e.g., tetraethyl orthosilicate), and silica hydroxides.

Sources of aluminum useful herein include aluminates, alumina, and aluminum compounds such as $AlCl_3$, $Al_2(SO_4)_3$, $Al(OH)_3$, kaolin clays, and other zeolites. Examples of other zeolites useful as a source of aluminum include LZ-210 and LZ-52 zeolites (types of Y zeolites).

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates, and acetates thereof.

For each embodiment described herein, the zeolite reaction mixture can be supplied by more than one source. Also, two or more reaction components can be provided by one source.

The reaction mixture can be prepared either batch wise or continuously. Crystal size, morphology and crystallization time of the zeolite described herein can vary with the nature of the reaction mixture and the crystallization conditions.

Crystallization and Post-Synthesis Treatment

In practice, aluminosilicate zeolite SSZ-56 is prepared by: (a) preparing a reaction mixture as described herein above; and (b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by a person skilled in the art that the zeolites described herein can contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount between 1% and 10% of the weight of the source of silicon used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA cation and/or M. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g., exposing the SDA-containing zeolite product to light or electromagnetic radiation that has a wavelength shorter than visible light under conditions sufficient to selectively remove the organic compound from the zeolite) as described in U.S. Pat. No. 6,960,327.

The zeolite can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Characterization of the Zeolite

Zeolites made by the process described herein have a composition, as-synthesized and in the anhydrous state, in terms of mole ratios, as described in Table 2, wherein compositional variables Q and M are as described herein above.

TABLE 2

|  | Broad | Exemplary |
|---|---|---|
| $SiO_2/Al_2O_3$ | 15 to 200 | 15 to 100 |
| $Q/SiO_2$ | 0.02 to 0.05 | 0.02 to 0.05 |
| $M/SiO_2$ | 0 to 0.03 | 0 to 0.03 |

Zeolites synthesized by the process disclosed herein can be characterized by their XRD pattern. The powder XRD lines of Table 3 are representative of as-synthesized aluminosilicate SSZ-56. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the X-ray diffraction pattern. Notwithstanding these minor perturbations, the basic crystal structure remains unchanged.

TABLE 3

Characteristic Peaks for As-Synthesized Al-SSZ-56

| 2-Theta[a] | d-spacing (nm) | Relative Absolute Intensity[b] |
|---|---|---|
| 6.58 | 1.342 | W |
| 7.40 | 1.194 | W |
| 7.94 | 1.113 | M |
| 8.38 | 1.054 | W |
| 8.80 | 1.004 | W |
| 13.20 | 0.670 | W |
| 13.50 | 0.655 | W |
| 13.91 | 0.636 | W |
| 14.80 | 0.598 | W |
| 20.32 | 0.437 | W |
| 21.10 | 0.421 | W |
| 21.74 | 0.408 | M |
| 22.32 | 0.398 | S |
| 23.12 | 0.384 | VS |
| 23.90 | 0.372 | S |
| 25.72 | 0.346 | W |
| 26.14 | 0.341 | W |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 4 are representative of calcined aluminosilicate SSZ-56.

TABLE 4

Characteristic Peaks for Calcined Al-SSZ-56

| 2-Theta[a] | d-spacing (nm) | Relative Absolute Intensity[b] |
|---|---|---|
| 6.60 | 1.339 | M |
| 7.42 | 1.190 | M |
| 7.92 | 1.115 | VS |
| 8.40 | 1.052 | M |
| 8.86 | 0.997 | S |
| 9.76 | 0.905 | W |
| 13.16 | 0.672 | W |
| 13.52 | 0.655 | W |
| 14.82 | 0.597 | M |
| 15.98 | 0.554 | M |
| 21.14 | 0.420 | W |
| 21.68 | 0.409 | M |
| 22.46 | 0.396 | S |
| 23.20 | 0.383 | VS |
| 23.92 | 0.370 | M |
| 25.76 | 0.346 | M |
| 26.40 | 0.337 | W |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

Synthesis of 1-Butyl-1-(3,3,5-trimethylcyclohexyl)piperidinium Hydroxide

I. Synthesis of 1-(3,3,5-trimethylcyclohexyl)piperidine: A three neck 500 mL flask was charged with 20 g (0.23 mole) of piperidine, 49 g (0.35 mole) of 3,3,5-trimethylcyclohexanone and 75 mL of anhydrous cyclohexane. To the resulting solution, 55 g (0.46 mole) of anhydrous magnesium sulfate ($MgSO_4$) was added and the mixture was mechanically stirred and heated at reflux (the reaction was monitored by NMR) for 144 hours. Then the reaction mixture was transferred to a 300 mL autoclave. The autoclave was sealed and affixed to a heating jacket and an overhead stirrer. The autoclave was heated to 80° C. and left to stir overnight at the autogenic pressure. The reaction mixture was stirred for 48 hours and then checked by NMR. The reaction mixture was filtered through a fritted glass funnel. The filtrate (containing cyclohexane, enamine products and excess 3,3,5-trimethylcyclohexanone) was subjected to hydrogenation in the presence of 10% Pd on activated carbon (4 g) at 65 psi of hydrogen pressure on a hydrogenation Parr shaker. The reaction mixture was left to shake overnight at room temperature. The reaction mixture was then filtered over a bed of Celite® and the filtrate was concentrated to remove the cyclohexane solvent. The resulting oil (containing excess 3,3,5-trimethylcyclohexanone and the hydrogenated enamine product, 3,3,5-trimethylcyclohexyl-piperidine) was treated with 300 mL of 3M aqueous solution of HCl. The mixture was stirred in an ice bath for about 15 minutes and then 300 mL of diethyl ether was added. The organic phase was collected and concentrated to remove the diethyl ether and recover excess 3,3,5-trimethylcyclohexanone. The aqueous phase was treated with a 50 wt. % solution of aqueous NaOH dropwise in an ice bath until a pH of about 10 was reached. The mixture was left to stir at 0° C. for about 30 minutes. The mixture was then extracted with diethyl ether. The ether extract was dried over anhydrous $MgSO_4$, filtered and concentrated at reduced pressure on a rotary evaporator to give 38 g of a yellowish oily substance with a pungent odor. NMR analysis indicated the presence of a minor impurity (piperidine). The oil was taken directly to the next step (quaternization) without further purification.

II. Quaternization (Synthesis of 1-butyl-1-(3,3,5-trimethylcyclohexyl)piperidinium iodide): A 300 mL autoclave was charged with 13 g of the oily product synthesized above, 8 g (0.079 mol) of potassium bicarbonate and 23 g (0.124 mol) of 1-iodobutane. To this mixture, 50 mL of anhydrous acetonitrile was added. The autoclave was sealed and affixed to an overhead stirrer and heating sleeve and heated to 80° C. The reaction mixture was left to stir at 80° C. and autogenic pressure for 48 hours. NMR analysis indicated that the reaction was incomplete. Then, an additional equivalent (11.5 g) of 1-iodobutane was added and the reaction was again heated up to 80° C. and left to stir for another 24 hours. The reaction mixture was then cooled down, transferred to a round bottom flask and concentrated under reduced pressure on a rotary evaporator to remove acetonitrile. The residue obtained was dissolved in 500 mL of chloroform and the mixture was filtered to remove the inorganic salts. The chloroform layer containing the desired organic salt, unreacted amines and excess iodides was concentrated under reduced pressure on a rotary evaporator. The obtained slurry-like materials were rinsed thoroughly with diethyl ether to remove the unreacted amines, excess iodides and any organics other than the desired salt. The mixture was then filtered. The filter cake was collected, washed again with diethyl ether and dried to give 18 g of a tan colored solid. The solid was re-crystallized from isobutyl alcohol. Re-crystallization afforded 16.5 g of off-white crystals. These crystals were re-crystallized again by dissolving in isopropyl alcohol and then precipitating with slow addition of diethyl ether to give 14.7 g of white crystals. NMR analysis indicated the product was the desired 1-butyl-1-(3,3,5-trimethylcyclohexyl)piperidinium iodide.

III. Ion exchange (Synthesis of 1-butyl-1-(3,3,5-trimethylcyclohexyl)piperidinium hydroxide): The 1-butyl-1-(3,3,5-trimethylcyclohexyl)piperidinium iodide salt (12 g, 30 mmol) was dissolved in 30 mL of deionized water in a 100 mL volume plastic bottle. To the solution, 37.5 g of anion exchange resin-OH (BIO-RAD AG® 1-X8) was added and the mixture was stirred in a hot water bath for several hours and then left to stir at room temperature overnight. The mixture was then warmed up to about 80° C., stirred at that temperature for 1 hour and then filtered. The ion exchange resin was rinsed with additional 15 mL of deionized water. The original filtrate and the rinse were combined and a small amount was titrated with 0.1N HCl to indicate the presence of 24 mol hydroxide (24 mol of 1-butyl-1-(3,3,5-trimethylcyclohexyl)piperidinium hydroxide) in the solution or a hydroxide ion concentration of 0.43M.

Scheme 1 below depicts the synthesis of the SDA.

Scheme 1

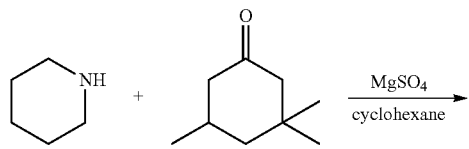

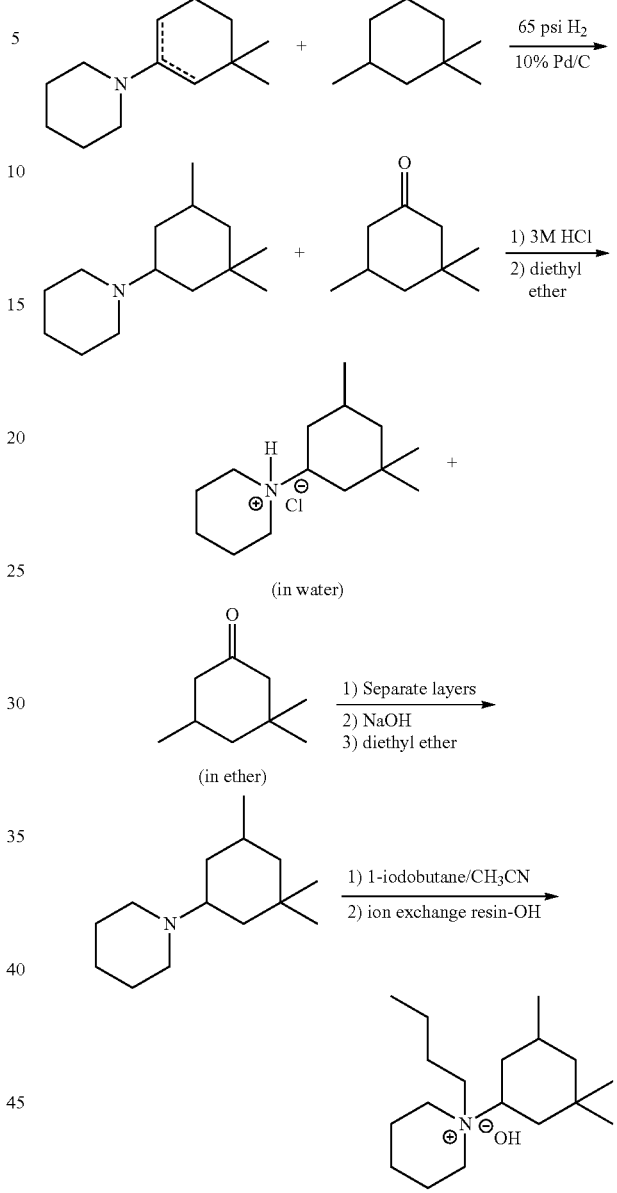

Example 2

Synthesis of Al-SSZ-56

Figure 2:
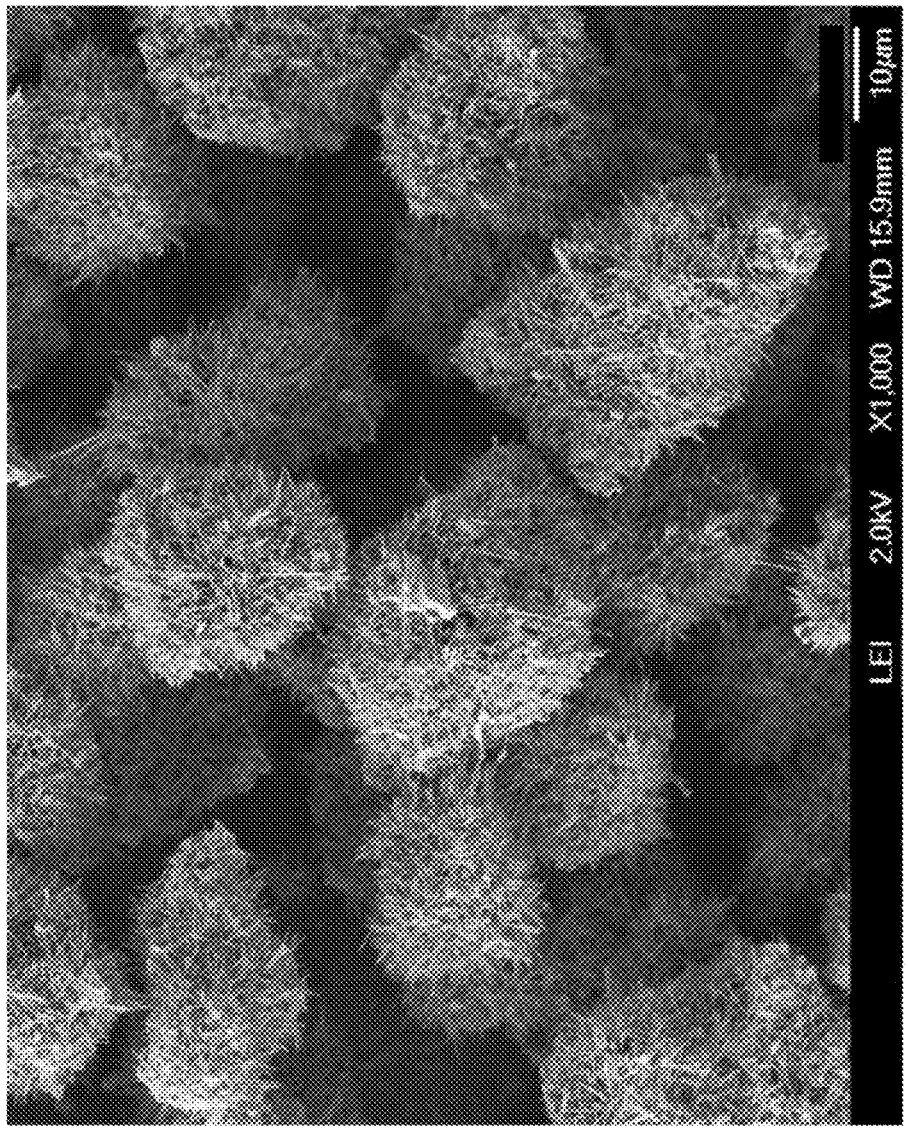
FIG. 2 shows the scanning electron microscopy (SEM) image of the aluminosilicate SSZ-56 product of Example 2.
Figure 3:
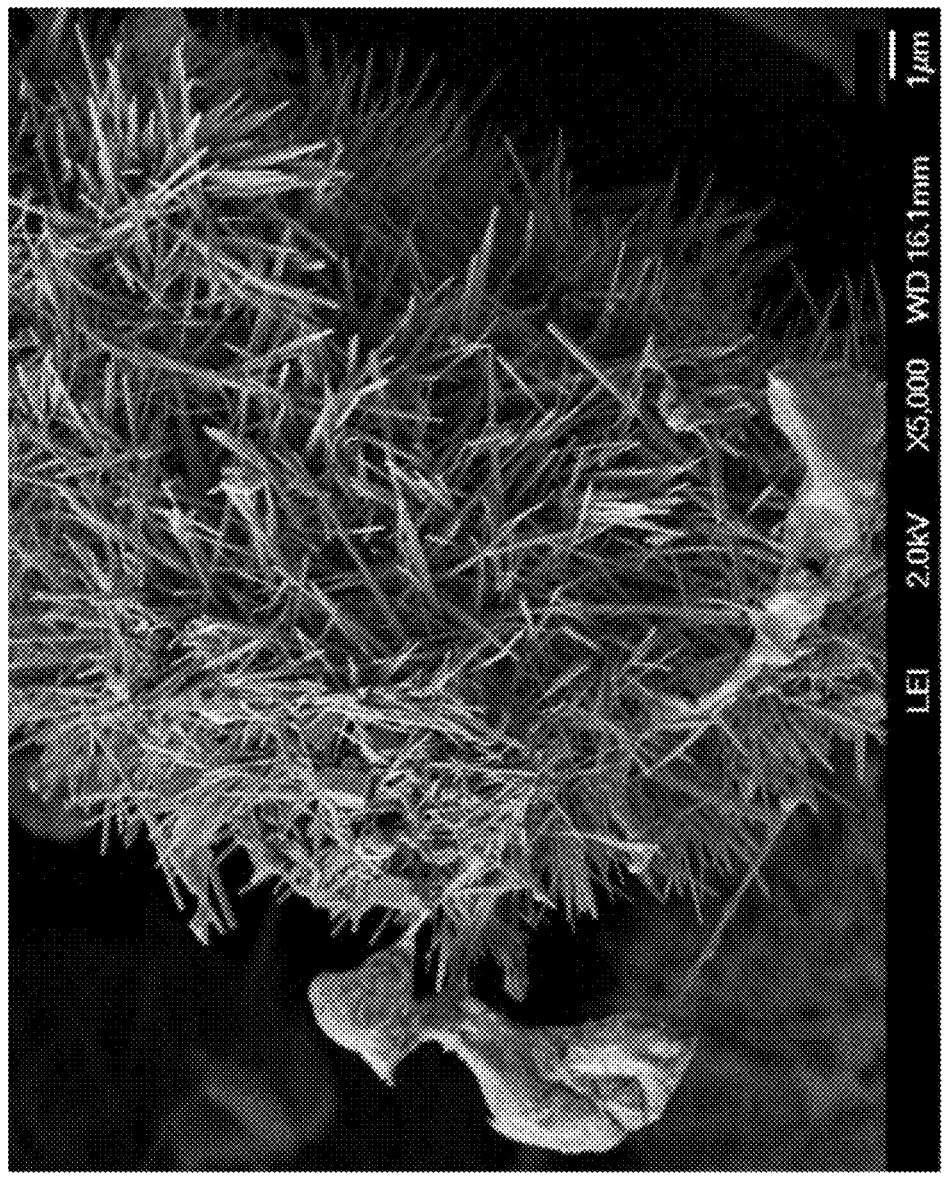
FIG. 3 also shows a SEM image of the aluminosilicate SSZ-56 product of Example 2.

A 23 mL Teflon liner was charged with 5.2 g of a hydroxide solution of the SDA as prepared in Example 1 and 1.5 g of a 1N aqueous NaOH solution. Deionized water was then added until a total solution weight of 7.6 g was achieved. To this solution, 0.26 g of zeolite LZ-52 (Union Carbide Corp.) was added and mixed thoroughly. Finally, 0.8 g of CAB-O-SIL® M-5 (Cabot Corp.) was added slowly and the gel thoroughly mixed. The Teflon liner was then capped and sealed in an autoclave and placed in a convection oven at 160° C. The autoclave was tumbled at 43 rpm over the course of 15 days in the heated oven. The progress of the reaction was monitored by SEM. Once crystallization was complete, the autoclave was then removed and allowed to cool to room temperature. The solids were then recovered by filtration and washed thoroughly with deionized water. The solids were then allowed to dry at room temperature and then in an oven at 115° C. for 2 hours. The powder XRD pattern of the resulting product is shown in FIG. 1 and identified the product as SSZ-56. SEM micrographs show that the Al-SSZ-56 crystals have a needle-like morphology (see FIG. 2 and FIG. 3). In contrast, B-SSZ-56 crystals are reported as having plate-like morphologies in which the plate lengths are about twice the plate widths and about ten times the plate thicknesses (see S. Elomari et al. *Microporous Mesoporous Mater.* 2009, 118, 325-333).

Example 3

Seeded Synthesis of Al-SSZ-56

Example 2 was repeated except that 50 mg of Al-SSZ-56 from a previous synthesis were added as seeds to the reaction mixture. The reaction afforded pure Al-SSZ-56 in 8 days versus 15 days without seeding.

Example 4

Calcination of Al-SSZ-56

Figure 4:
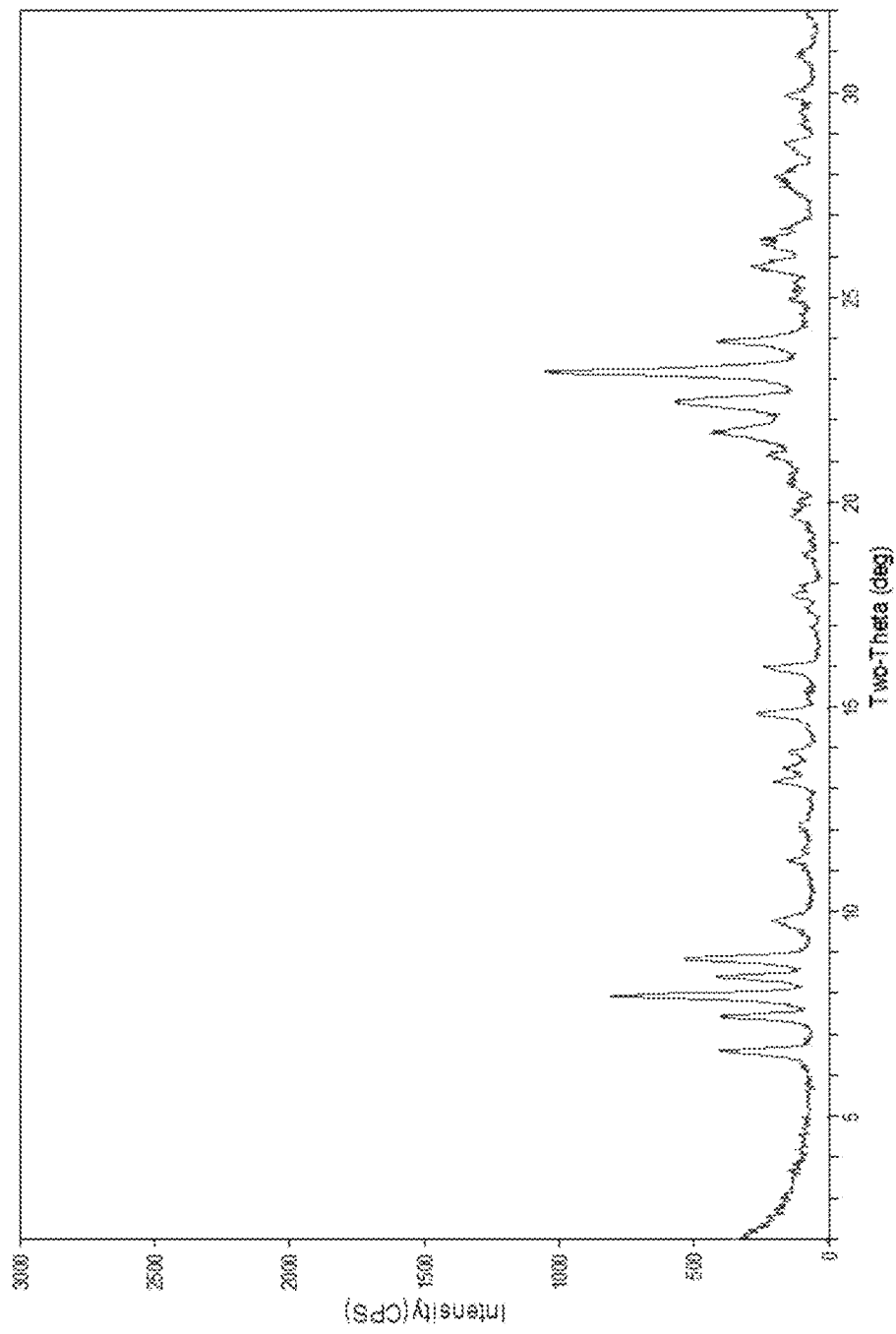
FIG. 4 shows the powder XRD pattern of the calcined aluminosilicate SSZ-56 product of Example 4.

The product of Example 2 was calcined inside a muffle furnace under a flow of 2% oxygen/98% nitrogen heated to 595° C. at a rate of 1° C./min and held at 595° C. for five hours, cooled and then analyzed by powder XRD. The XRD pattern of the calcined product is shown in FIG. 4. The XRD pattern indicates that the material remains stable after calcination to remove the organic SDA.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing aluminosilicate zeolite SSZ-56 comprising contacting under crystallization conditions (1) at least one source of silicon; (2) at least one source of aluminum; (3) hydroxide ions; and (4) a 1-butyl-1-(3,3,5-trimethylcyclohexyl)piperidinium cation.

2. The method of claim 1, wherein the zeolite is prepared from a reaction mixture comprising, in terms of mole ratios, the following:

| | |
|---|---|
| $SiO_2/Al_2O_3$ | 15 to 200 |
| $OH^-/SiO_2$ | 0.10 to 0.50 |
| $Q/SiO_2$ | 0.05 to 0.50 |
| $M/SiO_2$ | 0.02 to 0.40 |
| $H_2O/SiO_2$ | 20 to 80 | wherein Q is a 1-butyl-1-(3,3,5-trimethylcyclohexyl)piperidinium cation and M is selected from the group consisting of elements from Groups 1 and 2 of the Periodic Table.

3. The method of claim 1, wherein the zeolite is prepared from a reaction mixture comprising, in terms of mole ratios, the following:

| | |
|---|---|
| $SiO_2/Al_2O_3$ | 30 to 60 |
| $OH^-/SiO_2$ | 0.20 to 0.30 |
| $Q/SiO_2$ | 0.10 to 0.30 |
| $M/SiO_2$ | 0.10 to 0.25 |
| $H_2O/SiO_2$ | 30 to 45 | wherein Q is a 1-butyl-1-(3,3,5-trimethylcyclohexyl)piperidinium cation and M is selected from the group consisting of elements from Groups 1 and 2 of the Periodic Table.

4. The method of claim 1, wherein the zeolite has, in its calcined form, an X-ray diffraction pattern substantially as shown in the following Table:

| 2-Theta | d-spacing (nm) | Relative Absolute Intensity |
|---|---|---|
| 6.60 ± 0.20 | 1.339 | M |
| 7.42 ± 0.20 | 1.190 | M |
| 7.92 ± 0.20 | 1.115 | VS |
| 8.40 ± 0.20 | 1.052 | M |
| 8.86 ± 0.20 | 0.997 | S |
| 9.76 ± 0.20 | 0.905 | W |
| 13.16 ± 0.20 | 0.672 | W |
| 13.52 ± 0.20 | 0.655 | W |
| 14.82 ± 0.20 | 0.597 | M |
| 15.98 ± 0.20 | 0.554 | M |
| 21.14 ± 0.20 | 0.420 | W |
| 21.68 ± 0.20 | 0.409 | M |
| 22.46 ± 0.20 | 0.396 | S |
| 23.20 ± 0.20 | 0.383 | VS |
| 23.92 ± 0.20 | 0.370 | M |
| 25.76 ± 0.20 | 0.346 | M |
| 26.40 ± 0.20 | 0.337 | W. |

5. An aluminosilicate SSZ-56 zeolite having a composition, as-synthesized and in its anhydrous state, in terms of mole ratios as follows:

| | |
|---|---|
| $SiO_2/Al_2O_3$ | 15 to 200 |
| $Q/SiO_2$ | 0.02 to 0.05 |
| $M/SiO_2$ | 0 to 0.03 | wherein Q is a 1-butyl-1-(3,3,5-trimethylcyclohexyl)piperidinium cation and M is selected from the group consisting of elements from Groups 1 and 2 of the Periodic Table.

6. The aluminosilicate SSZ-56 zeolite of claim 5, wherein the zeolite has a composition, as-synthesized and in its anhydrous state, in terms of mole ratios as follows:

| | |
|---|---|
| $SiO_2/Al_2O_3$ | 15 to 100 |
| $Q/SiO_2$ | 0.02 to 0.05 |
| $M/SiO_2$ | 0 to 0.03. |

7. The aluminosilicate SSZ-56 zeolite of claim 5, wherein the zeolite has, in its as-synthesized form, an X-ray diffraction pattern substantially as shown in the following Table:

| 2-Theta | d-spacing (nm) | Relative Absolute Intensity |
|---|---|---|
| 6.58 ± 0.20 | 1.342 | W |
| 7.40 ± 0.20 | 1.194 | W |
| 7.94 ± 0.20 | 1.113 | M |
| 8.38 ± 0.20 | 1.054 | W |
| 8.80 ± 0.20 | 1.004 | W |
| 13.20 ± 0.20 | 0.670 | W |
| 13.50 ± 0.20 | 0.655 | W |
| 13.91 ± 0.20 | 0.636 | W |
| 14.80 ± 0.20 | 0.598 | W |
| 20.32 ± 0.20 | 0.437 | W |
| 21.10 ± 0.20 | 0.421 | W |
| 21.74 ± 0.20 | 0.408 | M |
| 22.32 ± 0.20 | 0.398 | S |
| 23.12 ± 0.20 | 0.384 | VS |
| 23.90 ± 0.20 | 0.372 | S |
| 25.72 ± 0.20 | 0.346 | W |
| 26.14 ± 0.20 | 0.341 | W. |

\* \* \* \* \*